(12) United States Patent
Hoeflin et al.

(10) Patent No.: US 9,241,045 B2
(45) Date of Patent: Jan. 19, 2016

(54) METHOD OF GENERATING ROUND ROBIN SERVICE ORDER LISTS FOR IMPROVING SERVICE PERFORMANCE DURING SERVER FAILURES

(75) Inventors: David Hoeflin, Middletown, NJ (US); Yury Bakshi, Morganville, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 997 days.

(21) Appl. No.: 13/407,312

(22) Filed: Feb. 28, 2012

(65) Prior Publication Data

US 2012/0159233 A1 Jun. 21, 2012

Related U.S. Application Data

(63) Continuation of application No. 12/266,854, filed on Nov. 7, 2008, now Pat. No. 8,150,965.

(51) Int. Cl.
| | |
|---|---|
| G06F 11/00 | (2006.01) |
| G06F 15/16 | (2006.01) |
| G06F 15/173 | (2006.01) |
| H04M 11/00 | (2006.01) |
| H04L 29/08 | (2006.01) |
| H04L 29/14 | (2006.01) |
| H04L 29/06 | (2006.01) |

(52) U.S. Cl.
CPC ............ *H04L 67/327* (2013.01); *H04L 69/40* (2013.01); *H04L 65/1063* (2013.01)

(58) Field of Classification Search
CPC ............ H04L 67/1002; H04L 67/1008; H04L 67/1027; H04M 2215/202; H04W 28/08
USPC .......................................................... 714/55
See application file for complete search history.

(56) References Cited

U.S. PATENT DOCUMENTS

| | | | |
|---|---|---|---|
| 6,141,759 A * | 10/2000 | Braddy | 726/14 |
| 6,601,084 B1 | 7/2003 | Bhaskaran et al. | |
| 6,880,089 B1 | 4/2005 | Bommareddy et al. | |
| 7,209,551 B1 * | 4/2007 | Schroeder et al. | 379/88.13 |
| 2004/0078622 A1 * | 4/2004 | Kaminsky et al. | 714/4 |
| 2005/0068946 A1 | 3/2005 | Beshai | |
| 2005/0198190 A1 * | 9/2005 | Zavalkovsky et al. | 709/217 |

* cited by examiner

*Primary Examiner* — Phuoc Nguyen
*Assistant Examiner* — Kishin G Belani
(74) *Attorney, Agent, or Firm* — Greenblum & Bernstein, P.L.C.

(57) ABSTRACT

A method controls the routing of service requests to a plurality of servers using a first routing distribution algorithm. The method includes waiting a first period of time for a designated server to respond to a service request, transmitting the service request to the designated server a second time, and waiting a second period to time for the designated server to respond to the service request assigned to the designated server, the second period of time being longer than the first period of time. The method also includes determining that the designated server has failed, rerouting the service request to a different server, and routing the service requests to the plurality of servers using a second routing distribution algorithm.

9 Claims, 9 Drawing Sheets

RESULTS

No more than 1 reroute to
a different server allowed

BE1_RR_List = (1 2 3)

BE2_RR_List = (1 2 3)

$QQQ^T = (0\ 0.083\ 0)$ $UU^T = (0\ 1.333\ 0.833)$

PRIOR ART

RESULTS $QQQ^T = (0\ 0\ 0)$

No more than 1 reroute to
a different server allowed

BE1_RR_List = (1 2 3 1 3 2)

BE2_RR_List = (1 2 3 1 3 2)

FIGURE 7

RESULTS

BEi_RR_List = (1 2 3 4)

No more than 2 reroutes to a different server allowed

$QQQ^T = (0\ 0\ 0.017\ 0)$ $UU^T = (0\ 1.5\ 1.25\ 0.95)$

PRIOR ART

FIGURE 8

RESULTS

BEi_RR_List =

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|----|----|----|----|----|----|----|----|----|----|----|----|----|----|
| 1 | 2 | 3 | 4 | 1 | 2 | 4 | 3 | 1 | 3 | 2  | 4  | 1  | 3  | 4  | 2  | 1  | 4  | 2  | 3  | 1  | 4  | 3  | 2  |

No more than 2 reroutes to a different server allowed $UU^T = (0\ 1\ 1\ 1)$ $QQQ^T = (0\ 0\ 0\ 0)$

METHOD OF GENERATING ROUND ROBIN SERVICE ORDER LISTS FOR IMPROVING SERVICE PERFORMANCE DURING SERVER FAILURES

CROSS REFERENCE

This application is a continuation of application Ser. No. 12/266,854, filed Nov. 7, 2008, which issued as U.S. Pat. No. 8,150,965 on Apr. 3, 2012, the disclosure of which is incorporated by reference herein in its entirety.

BACKGROUND

1. Field of the Disclosure

The present disclosure relates to the field of communications. More particularly, the present disclosure relates to method of maintaining a uniform distribution of requests to a plurality of network communication nodes by generating round robin service order lists that improve service performance during server failures.

2. Background Information

Conventional round robin (RR) algorithms are used to distribute requests or calls in telecommunication networks among several identical servers. Typically, networks using RR algorithms distribute requests or calls evenly when all servers in the pool are available. However, a server failure may cause uneven request or call distribution among the rest of the servers resulting in service degradation. For example, a server failure may cause increased call or request blocking, increased call setup delay, and/or reduced client/server throughput.

This uneven request/call distribution is caused by the order in which clients distribute calls among servers. Clients, using conventional round robin algorithms, distribute calls or requests to servers in the same order (i.e., $server_1$, $server_2$ ... $server_n$, $server_1$, $server_2$ ... $server_n$, etc.). When one of the servers fails, each client will reroute load to the same next server in the list, resulting in an overload of the next server.

This problem is typically observed in networks with "ignorant" clients, i.e., clients that are unaware of the server status and continue to distribute arriving requests/calls to all servers including the ones that are unavailable. In such networks, the client will typically wait for response from the failed server for a specified period of time, then will reattempt to distribute the request/call to the same failed server one or more times and, if unsuccessful, the client will attempt to redistribute the request/call to the next server in its round robin service order list.

DETAILED DESCRIPTION

In view of the foregoing, the present disclosure, through one or more of its various aspects, embodiments and/or specific features or sub-components, is thus intended to bring out one or more of the advantages as specifically noted below.

According to an aspect of the present disclosure, a network communication node includes a request distribution manager that combines permutations of sequences for routing requests to a plurality of servers, and that generates instructions for routing the requests to the plurality of servers, based on the combination of the plurality of permutations; and a router that routes the requests to the plurality of servers based on the instructions.

In another aspect of the present disclosure, the request distribution manager combines a list of every permutation of sequences for routing the requests to the plurality of servers.

In an aspect of the present disclosure, the network communication node routes requests to each of the servers, regardless of availability of each of the plurality of servers.

In yet another aspect of the present disclosure, one of the servers has failed. The permutations vary the order for routing the requests for all but the one of the servers that has failed.

Alternatively, the servers includes N application servers, the request distribution manager generates (N−1)! permutations of sequences for routing the requests to the N application servers, and the instructions include a list of the (N−1)! permutations of sequences.

In another aspect of the present disclosure, the network communication node includes a border element in a voice over internet protocol system.

According to an aspect of the present disclosure, a method of maintaining a uniform distribution of requests to a plurality of network communication nodes include generating permutations of sequences for routing the requests to the plurality of network communication nodes; generating instructions for routing the requests based on a combination of the permutations; and routing the requests to the plurality of network communication nodes based on the instructions.

In an aspect of the present disclosure, the method entails combining a list of every permutation of sequences for routing the requests to the network communication nodes.

In another aspect of the present disclosure, the method entails routing the requests to each of the network communication nodes, regardless of availability of each of the network communication nodes.

In another aspect of this method, at least one of the network communication nodes that has failed. In yet another embodiment, the permutations vary the order for routing the requests for all but the one of the servers that has failed.

Alternatively, the network communication nodes include N application servers, and the instructions include a list of (N−1)! permutations of sequences for routing the requests to the N application servers.

In another aspect, the routing is performed by a border element in a voice over interne protocol system.

According to an aspect of the present disclosure, a computer readable medium for storing a computer program uniformly distributes requests to network communication nodes. The computer readable medium includes a permutation generation code segment that generates permutations of sequences for routing the requests to the network communication nodes. A request distribution management code segment generates instructions for routing the requests, based on a combination of the permutations. A routing code segment routes the requests to the network communication nodes based on the instructions.

In an aspect of the present disclosure, the request distribution management code segment combines a list of every permutation of sequences for routing the requests to the network communication nodes.

In another aspect of the present disclosure, the routing code segment routes requests to each of the network communication nodes, regardless of availability of each of the network communication nodes.

In yet another aspect of the present disclosure, at least one of the network communication nodes has failed. In an embodiment, the permutations vary the order for routing the requests for all but the one of the servers that has failed.

In another aspect of the present disclosure, the network communication nodes include N application servers, and the instructions include a list of (N−1)! permutations of sequences for routing the requests to the N application servers.

In view of the above, the present disclosure through one or more of its various aspects and/or embodiments is presented to accomplish one or more objectives and advantages, such as those noted below.

The various aspects and embodiments of the present disclosure are described in detail below.

Figure 1:
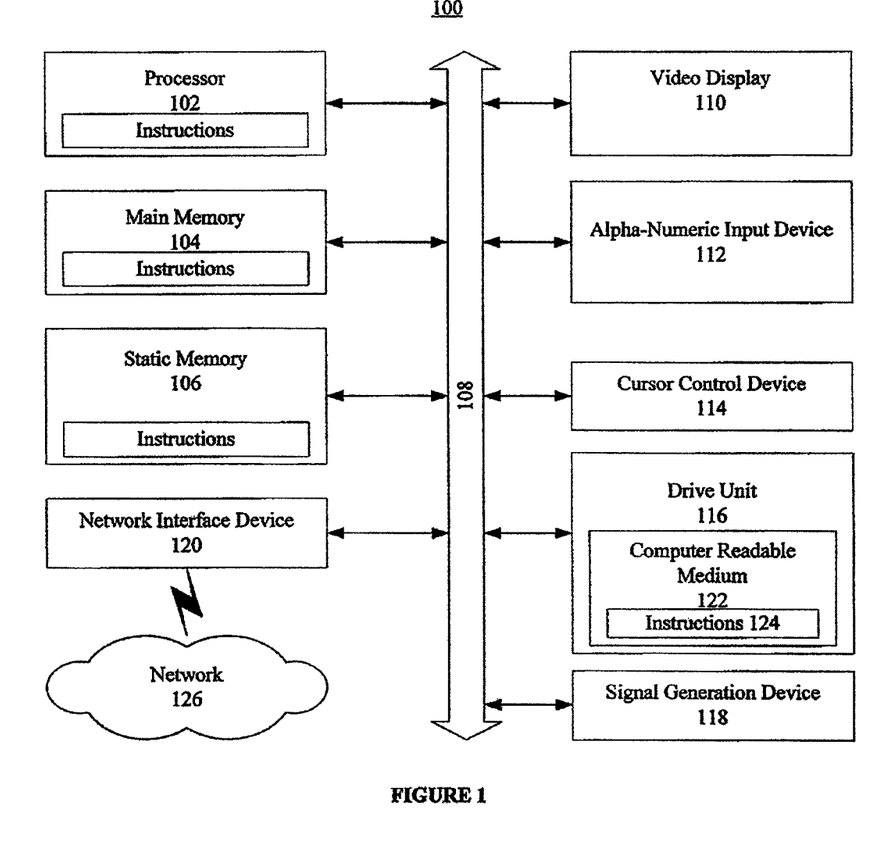
FIG. 1 shows an exemplary general computer system that includes a set of instructions for maintaining a uniform distribution of requests to servers by generating the round robin service order lists that is used by each client and improves service performance during server failures.

FIG. 1 is an illustrative embodiment of a general computer system, on which a method of generating round robin service order lists for improving service performance during server failures can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 126, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 102, for example, a central processing unit (CPU), a graphics processing unit (GPU), or both. Moreover, the computer system 100 can include a main memory 104 and a static memory 106 that can communicate with each other via a bus 108. As shown, the computer system 100 may further include a video display unit 110, such as a liquid crystal display (LCD), an organic light emitting diode (OLED), a flat panel display, a solid state display, or a cathode ray tube (CRT). Additionally, the computer system 100 may include an input device 112, such as a keyboard, and a cursor control device 114, such as a mouse. The computer system 100 can also include a disk drive unit 116, a signal generation device 118, such as a speaker or remote control, and a network interface device 120.

In a particular embodiment, as depicted in FIG. 1, the disk drive unit 116 may include a computer-readable medium 122 in which one or more sets of instructions 124, e.g. software, can be embedded. A computer-readable medium 122 is a tangible article of manufacture, from which sets of instructions 124 can be read. Further, the instructions 124 may embody one or more of the methods or logic as described herein. In a particular embodiment, the instructions 124 may reside completely, or at least partially, within the main memory 104, the static memory 106, and/or within the processor 102 during execution by the computer system 100. The main memory 104 and the processor 102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 122 that includes instructions 124 or receives and executes instructions 124 responsive to a propagated signal, so that a device connected to a network 126 can communicate voice, video or data over the network 126. Further, the instructions 124 may be transmitted or received over the network 101 via the network interface device 120.

Figure 2:
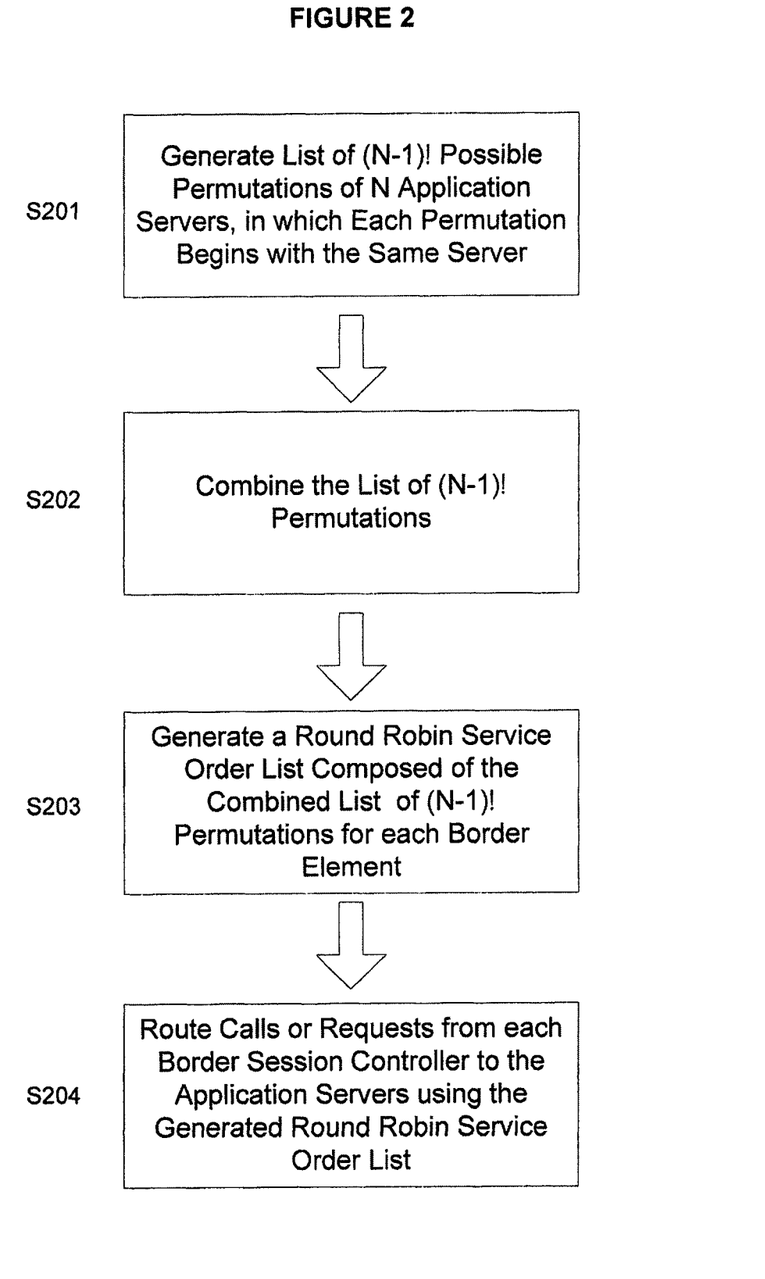
FIG. 2 is a flowchart depicting an exemplary process of routing requests using round robin service order lists, according to an aspect of the present disclosure.

FIG. 2 illustrates an exemplary process for routing requests using round robin service order lists, according to an aspect of the present disclosure. In Step S201, a request distribution manager (which includes hardware and/or software elements) for border elements (BE) generates a list of (N−1)! permutations of N application servers, in which each permutation begins with a predetermined application server. For example, if there are 3 application servers (N=3) and each permutation begins with the first application server (AS1), then there are two possible permutations: 1) AS1, AS2, AS3, and 2) AS1, AS3, AS2.

Then, in Step S202, the request distribution manager combines the list of (N−1)! permutations. Therefore, using the aforementioned example, the combined list of permutations would be: AS1, AS2, AS3, AS1, AS3, AS2. In Step S203, the request distribution manager generates a round robin service list composed of the combined list of (N−1)! permutations for each border element. Therefore, AS1, AS2, AS3, AS1, AS3, AS2 would be the round robin service order list for the above example. Lastly, in Step S204, a router unit (which comprises hardware and/or software elements) of the border element (or client) routes calls or requests to the application servers, using this generated round robin service order list. In other words, the router unit of the border element (or client) forwards or distributes calls or requests to the application servers.

Figure 3:
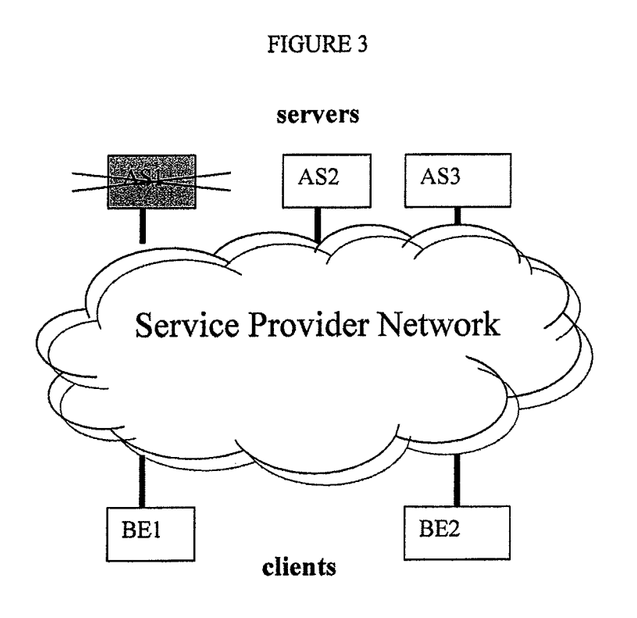
FIG. 3 illustrates a portion of an exemplary Voice over Internet Protocol (VoIP) network architecture related to the present disclosure in which one application server has failed.

FIG. 3 illustrates a portion of an exemplary Voice over Internet Protocol (VoIP) network architecture related to the present disclosure in which one application server has failed. However, the present disclosure may be implemented in any type of packet network. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

A VoIP network includes various types of customer endpoint devices connected via various types of access networks to a carrier (a service provider) VoIP core infrastructure over an Internet Protocol/Multi-Protocol Label Switching (IP/MPLS) based core backbone network. The present invention is described below in the context of an illustrative VoIP network. However, the present disclosure should not be interpreted to be limited by this particular illustrative architecture.

Customer endpoint devices can be either Time Division Multiplexing (TDM) based or IP based. Time Division Multiplexing based customer endpoint devices typically include Time Division Multiplexing phones and Private Branch Exchanges (PBXs). Time Division Multiplexing based customer endpoint devices access VoIP services by using either a Public Switched Telephone Network (PSTN) or a broadband access network. IP based customer endpoint devices access VoIP services by using a Local Area Network (LAN) with a VoIP gateway or router, respectively.

The core VoIP infrastructure includes several key VoIP components, e.g., Border Elements (BE), and VoIP related servers; these components (e.g., border elements and application servers) include both hardware and software elements.

Border elements reside at the edge of the VoIP core infrastructure and interfaces with customers endpoints over various types of access networks. Border elements are typically implemented as a Media Gateway and perform signaling, media control, security, and call admission control and related functions. Furthermore, BEs may need to interact with various VoIP related servers, including application servers (AS), in order to complete a call that require certain service specific features.

Figure 4:
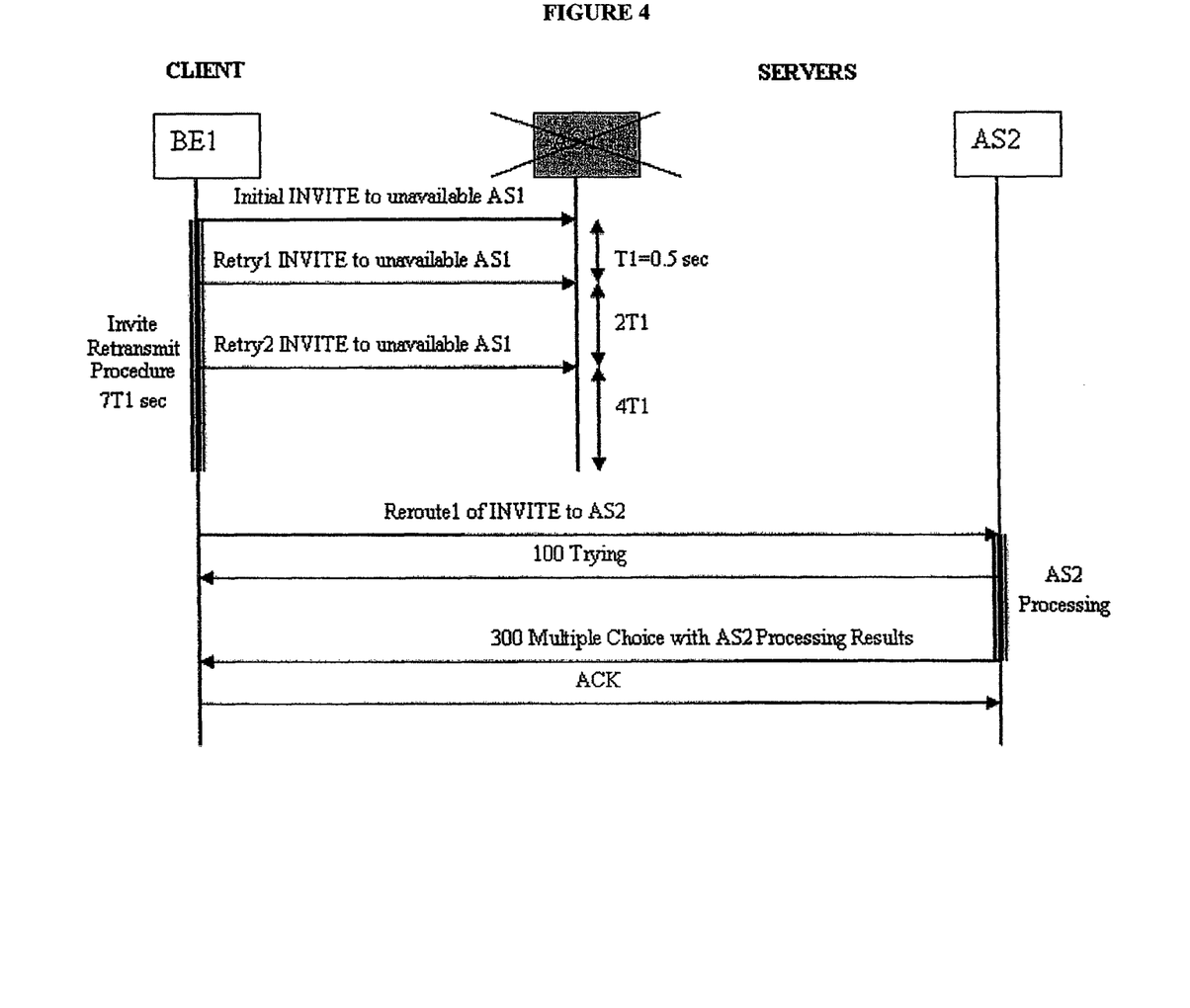
FIG. 4 provides an example of rerouting VoIP/SIP requests in the case of an application server failure, according to a conventional RR algorithm.

FIG. 4 provides an example of conventional rerouting of a VoIP/SIP requests in the case of an application server failure. During VoIP call setup, an SIP INVITE message is received by one of the Border Elements (BE) at the service provider network. To complete the call each of the BEs needs to obtain the information from any one of Application Servers: AS1, AS2, or AS3. For the sake of simplicity, the present non-limiting example includes two BEs and 3 ASs. In this example, it is assumed that application server AS1 has failed, but BE1 and BE2 continue to distribute new calls to all of the application servers (AS1, AS2, and AS3). Conventional round robin service order lists would distribute calls or requests to the application servers in the following order: AS1, AS2, AS3, AS1, AS2, AS3. Each BE distributes ⅓ of new calls to each AS.

In FIG. 4, the signaling message flow is initiated by the BE1 when it sends a SIP INVITE message to a failed application server AS1. The failed application server (AS1) does not respond. After waiting for a default waiting time (T1) of 500 ms, BE1 retransmits SIP INVITE to AS1 (in case the initial message loss was random), waits for response for a default waiting time (2T1) of 1000 ms, retransmits, waits for response for a default waiting time (4T1) of 2000 ms. If a response is not received after a predetermined number of SIP INVITE retransmits, e.g., two attempted retransmits, to AS1, BE1 sends SIP INVITE to the next AS in the round robin service order list: AS2. If AS2 is available, then AS2 will process the request and sends results back within a different SIP message, such as a Redirect 300 Multiple Choice message. BE1 will acknowledge receiving query results.

Depending on the rest of signaling setup flow, the originating BE will proceed with the rest of call setup by sending SIP INVITE message to the call terminating BE, or by sending SIP INVITE to another AS requesting further service related processing. The rest of the VoIP and SIP call set up process is well-known in the art; therefore, it is not described in detail in the present disclosure.

Figure 4A:
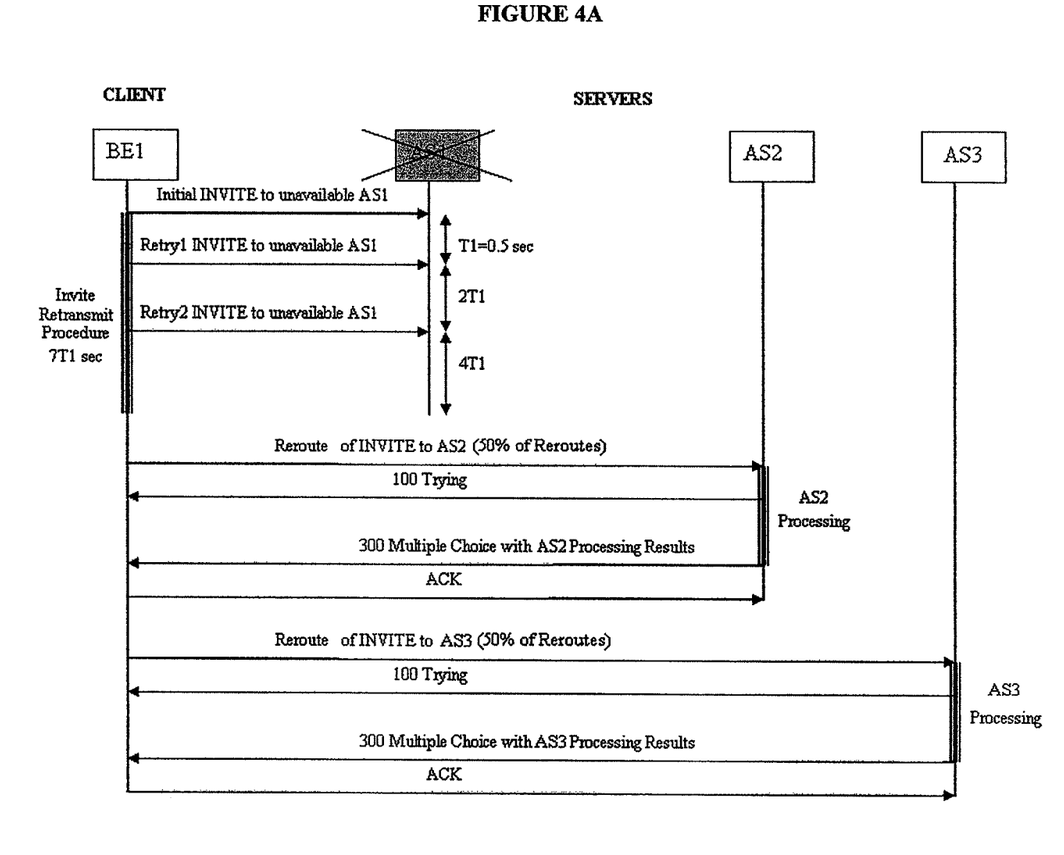
FIG. 4a provides an example of rerouting VoIP/SIP requests in the case of an application server failure, according to an aspect of the present disclosure.

FIG. 4*a* provides an example of rerouting VoIP/SIP requests in the case of an application server failure, wherein requests are routed using the round robin service order list according to an aspect of the present disclosure. As shown in FIG. 4*a*, the border element (BE1) routes requests to three application server (one of which is failed application server AS1). Using the round robin service order list according to an aspect of the present disclosure, 50% of the reroutes of the SIP INVITE messages are routed to AS2 and 50% of the reroutes of the SIP INVITE messages are routed to AS3, thereby evenly distributing the requests to surviving application servers AS2 and AS3.

In analyzing service degradation (e.g., increased call blocking and call delay) resulting from a server failure, it is important to discuss certain assumptions upon which the analysis is based. First, it is assumed that the pool of application servers is engineered for a single application server failure (i.e., N−1 surviving AS should be able to handle total traffic from all BEs). Hence, each application server should be engineered for utilization of up to (N−1)/N without failure. Thus, it is assumed that prior to a failure of one application server the utilization of each application server is equal to (N−1)/N. This assumption is based on the common practice of engineering the service provider network for single equipment and link failures.

Second, it is assumed that only one reroute of the SIP INVITE message to a different application server is allowed. If the second application server cannot handle the query too, due to failure or congestion, then the call is blocked. Furthermore, the maximum number of allowed SIP INVITE reroutes to the different server (in the second assumption) depends on call setup delay requirements (more reroutes increase call setup delay), and expected extra client/server work due to rerouting the same query to another server (the extra work to reroute queries may reduce client/server throughput). We chose a single query reroute in this example for simplicity.

Lastly, it is assumed that each extra reroute of the SIP INVITE message to a different application server results in extra 3.5 sec of call set up delay. The extra delay is estimated as the length of retransmit procedure: $7T1=7\times0.5=3.5$ sec (see FIG. 4). Although later examples provided herein include two reroutes for a larger network configuration, three or more reroutes to a different application server may add more than 10 sec (3×3.5) to a call setup, which would be prohibitive.

Figure 5:
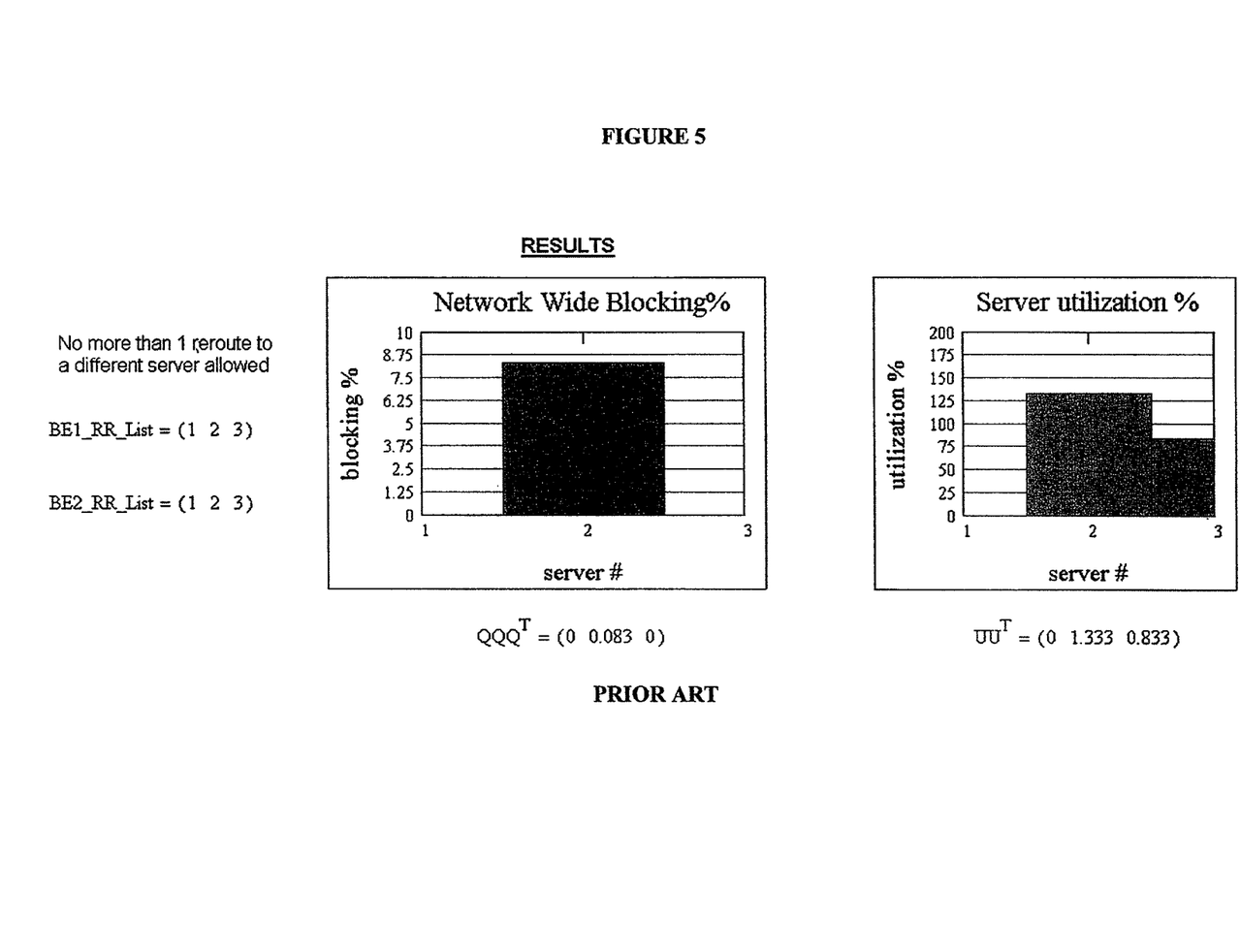
FIG. 5 shows a bar graph showing modeling results of two border elements routing requests to three application servers (where one of the three application servers has failed), using a conventional round robin service order list. The legend of the graph also shows the service order list for each border element.

FIG. 5 shows bar graphs illustrating modeling results of two border elements using a conventional round robin service order list. Below you can see modeling results when both BE1 and BE2 continue to distribute ⅓ of calls to failed AS1, and then reroute them to AS2 according to their round robin service order lists: AS1, AS2, AS3. The AS2 becomes overloaded and blocks 8.33% of total network load. The reason for that is an uneven distribution of requests among available AS2 & AS3 so that AS2 is overloaded (load is 1.3 times the server capacity) and is blocking the calls, and AS3 is underloaded (83% utilized) and is wasting available capacity. Hence, even though there is enough server capacity deployed in network to handle all calls when AS1 fails, the uneven call distribution between AS2 and AS3 results in blocking of 8.33% of calls. In the following section we will show how to fix round robin lists in BE1 & BE2 to avoid unnecessary call blocking.

Figure 6:
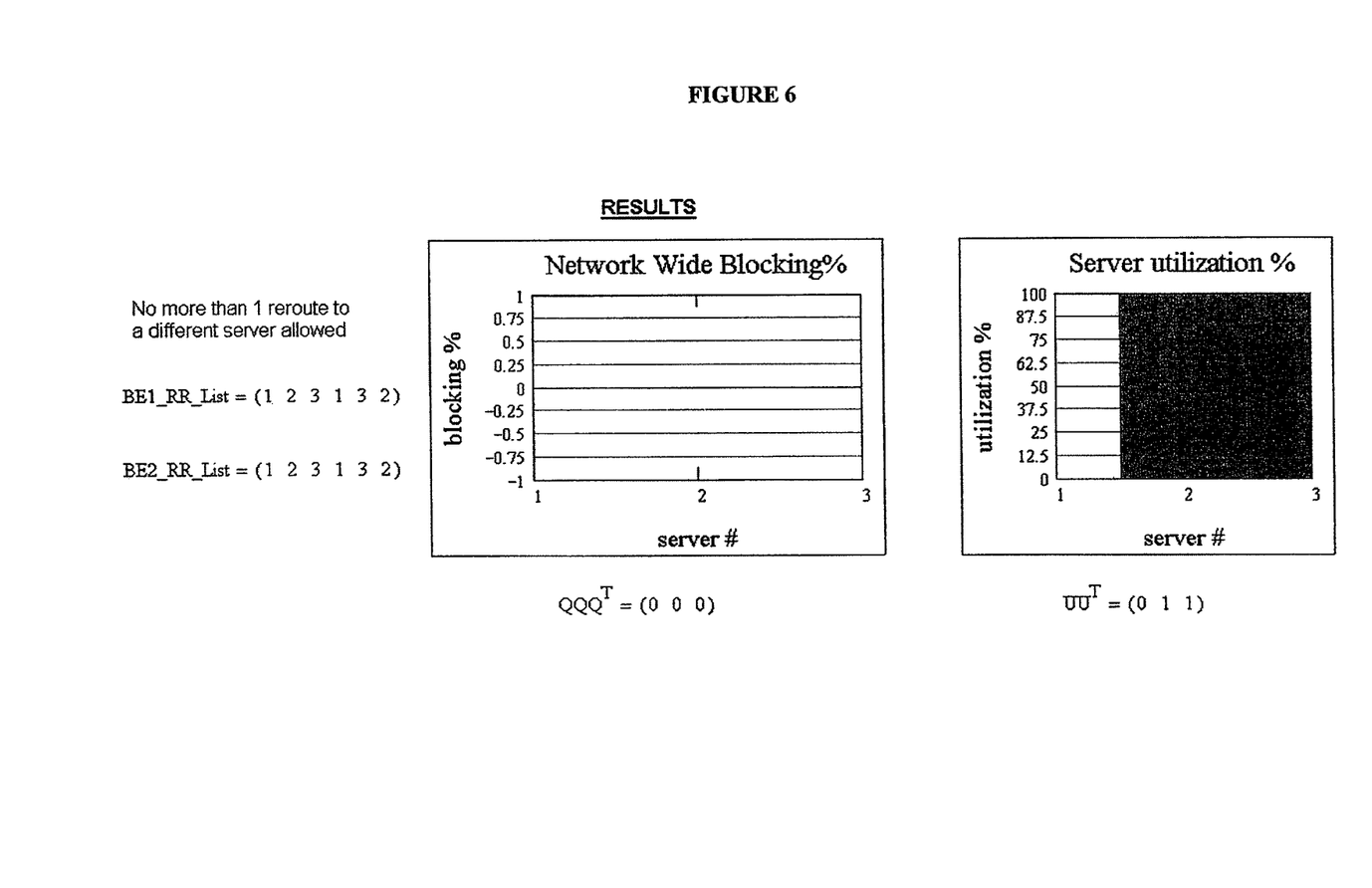
FIG. 6 shows a bar graph showing modeling results of two border elements routing requests to three application servers (where one of the three application servers has failed), using the round robin service order list, according to an aspect of the present disclosure. The legend of the graph also shows the service order list for each border element.

FIG. 6 shows bar graphs illustrating modeling results for two border elements routing requests to three application server (one of which is a failed application server), using the round robin service order list, according to an aspect of the present disclosure. The graphs illustrates modeling results when both BE1 and BE2 continue to distribute ⅓ of calls to the failed application server AS1, and then reroute them to AS2 & AS3 according to their proposed round robin service order lists: AS1, AS2, AS3, AS1, AS3, AS2. As you can see there is no blocking observed at AS2 & AS3. The reason for that is even distribution of rerouted SIP call requests among available AS2 & AS3 that results in servers being able to handle all calls. Both of the remaining servers, AS2 & AS3, are fully and equally utilized as shown in FIG. 6.

Figure 7:
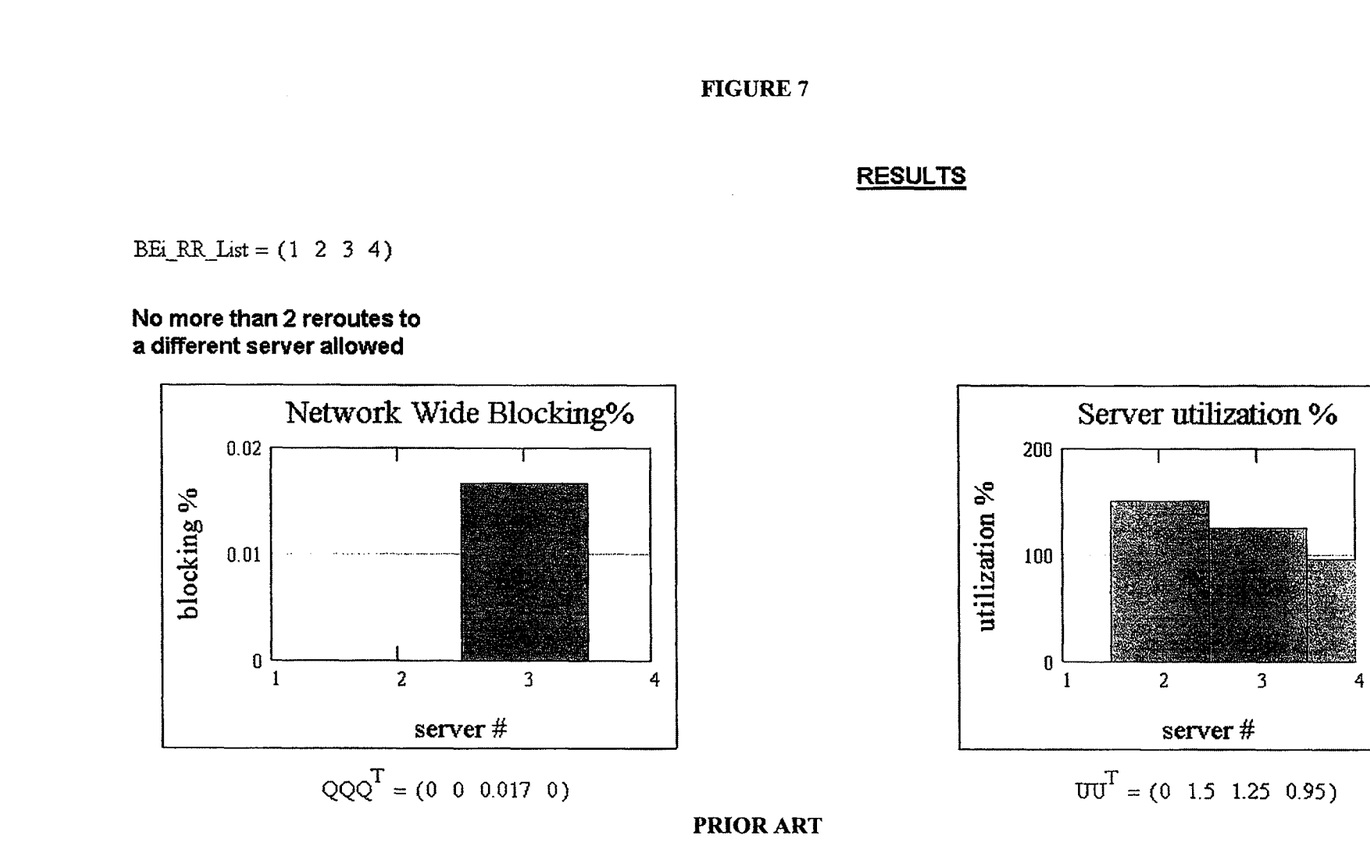
FIG. 7 shows a bar graph showing modeling results of six border elements routing requests to four application servers (where one of the four application servers has failed), using a conventional round robin service order list. The legend of the graph also shows the service order list for each border element.
Figure 8:
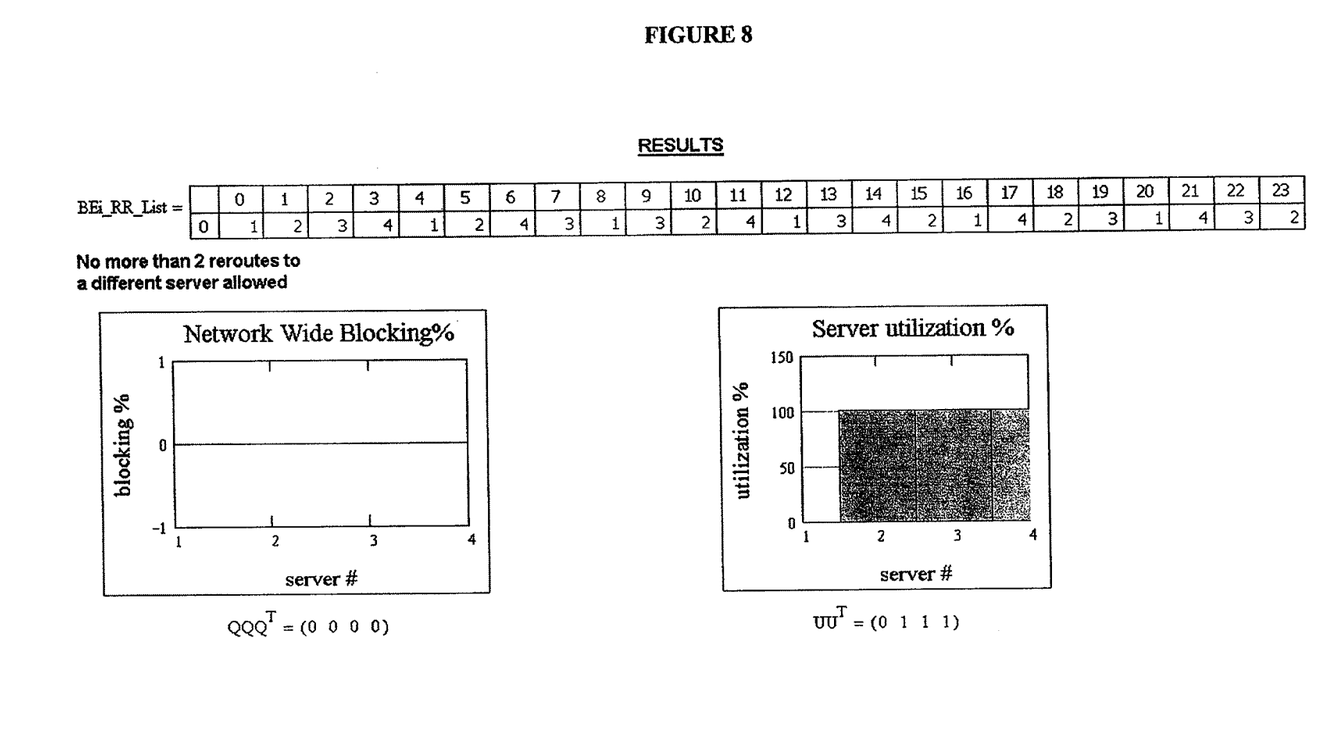
FIG. 8 shows a bar graph showing modeling results of six border elements routing requests to four application servers (where one of the four application servers has failed), using the round robin service order list, according to an aspect of the present disclosure. The legend of the graph also shows the service order list for each border element.

FIGS. 7 and 8 show model results for a larger network configuration (6 clients and 4 servers). In this example, the parameters for the models of the larger configuration have been slightly modified from the assumptions (or parameters), discussed for the smaller network configuration of two clients and three application servers. In the examples below, two reroutes of the SIP INVITE message to a different application servers are allowed. If the third application server, the call was rerouted to, cannot handle it, due to failure or congestion, then the call is blocked.

FIG. 7 shows bar graphs illustrating model results of six border elements routing requests to four application server (one of which is a failed application server), using a conventional round robin service order list. FIG. 7 shows the model results when all BEi continue to distribute ¼ of calls to the failed application server (AS1), and then reroute them to AS2 according to their round robin service order lists: AS1, AS2, AS3, AS4. The AS2 becomes overloaded and calls are rerouted further to AS3. AS3 also becomes overloaded and blocks some of the calls that were rerouted twice (first from AS1 to AS2, and then from AS2 to AS3). These calls are blocked because they cannot be rerouted 3rd time due to modeling assumptions. AS3 blocks 1.7% of total network load. The reason for that is an uneven distribution of requests among available AS2, AS3 and AS4 so that AS2 and AS3 are overloaded (with loads of 1.5 & 1.25 times the server capacity) and are blocking the calls (at AS3), and AS4 is underloaded (95% utilized) and is wasting available capacity. Hence even though there is enough server capacity deployed in network to handle all calls when AS1 fails, the uneven call distribution between AS2, AS3 and AS4 results in blocking of 1.7% of calls.

In contrast, FIG. 8 shows bar graphs illustrating model results for six border elements routing requests to four application server (one of which is a failed application server), using the round robin service order list, according to an aspect of the present disclosure. In this example, all six BEi continue to distribute ¼ of calls to the failed application server (AS1), and then reroute them to AS2, AS3 & AS4 according to the individually tailored round robin service order lists: AS1,AS2,AS3,AS4,AS1,AS2,AS4,AS3,AS1,AS3,AS2, AS4,AS1,AS3,AS4,AS2,AS1,AS4,AS2, AS3,AS1,AS4, AS3,AS2. As shown in the bar graphs, there is no call blocking observed at AS2, AS3 & AS4. The reason for that is even distribution of rerouted calls among available AS2, AS3 & AS4 that results in servers being able to handle all calls. Furthermore, all of the remaining servers, AS2, AS3 & AS4, are fully and equally utilized as shown in FIG. 8. These model results demonstrate how the round robin service order lists, according to the present disclosure, improve service performance during server failures.

Accordingly, the present invention ensures uniform load distribution from each client during a single server failure in networks with "ignorant" clients (i.e., client that distribute requests/call regardless of server availability). Hence, the proposed round robin service order list works well even when load generated by one of the clients is much larger than load from the rest of clients.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the present invention may also be implemented as a network communication node (e.g., a border element or client) that comprises a request distribution manager that generates every permutation of sequences for routing requests to a plurality of servers. Then, the request distribution manager in each border element (or client) randomly selects at least one of the generated permutations, and combines the generated permutations. Based on the combination of permutations, the request distribution manager generates a round robin service order list for routing requests to servers.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission (e.g., VoIP, SIP, TCP/IP, UDP/IP, SCTP) represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for controlling the routing of service requests to a plurality of servers, the method comprising:
    routing the service requests to the plurality of servers using a first routing distribution algorithm;
    waiting a first period of time for a designated server of the plurality of servers to respond to a service request assigned to the designated server;
    transmitting the service request to the designated server a second time when the designated server does not respond to the service request within the first period of time;
    waiting a second period to time for the designated server to respond to the service request assigned to the designated server, the second period of time being longer than the first period of time;
    determining that the designated server has failed when the designated server does not respond to the service request within the second period of time;
    rerouting the service request assigned to the designated server that has failed to a different server of the plurality of servers;
    routing the service requests to the plurality of servers using a second routing distribution algorithm,
    wherein the routing and rerouting are performed by a border element in a voice over internet protocol system, and
    wherein the first routing distribution algorithm is based on a round robin service order, and the second routing distribution algorithm is a modified version of the round robin service order of the first routing distribution algorithm that includes the designated server that has failed in a fixed order that does not vary, but varies the order of routing the service requests for all of the plurality of servers, except for the order of routing for the designated server that has failed, in a round robin service order.

2. The method described in claim 1, further comprising:
    waiting a third period of time for the designated server to respond to the service request assigned to the designated server, the third period of time being longer that the second period of time.

3. The method described in claim 1,
    wherein a same percentage of service requests, of a total number of service requests routed to the plurality of servers, are assigned to the designated server that has failed after determining that the designated server has failed as before determining that the designated server has failed.

4. The method described in claim 1,
wherein the second routing distribution algorithm evenly distributes the service requests among the plurality of servers, including the designated server that has failed.

5. The method described in claim 1, further comprising:
waiting a fourth period of time for the different server of the plurality of servers to respond to a service request assigned to the different server; and
transmitting the service request to the different server a second time when the different server does not respond to the service request within the fourth period of time.

6. The method described in claim 5, further comprising:
waiting a fifth period of time for the different server to respond the service request assigned to the different server; and
blocking the service request when the different server does not respond to the service request within the fifth period of time.

7. A network communication node for controlling the routing of service requests to a plurality of servers, the network communication node comprising:
a request distribution manager that assigns the service requests to the plurality of servers using a first distribution algorithm; and
a router that routes assigned service requests to the plurality of servers over a communications network,
wherein the request distribution manager waits a first period of time for a designated server of the plurality of servers to respond to a service request assigned to the designated server;
wherein the request distribution manager has the router transmit the service request to the designated server a second time when the designated server does not respond to the service request within the first period of time;
wherein the request distribution manager waits a second period to time for the designated server to respond to the service request assigned to the designated server, the second period of time being longer than the first period of time;
wherein the request distribution manager determines that the designated server has failed when the designated server does not respond to the service request within the second period of time;
wherein the request distribution manager has the router reroute the service request assigned to the designated server that has failed to a different server of the plurality of servers;
wherein the request distribution manager assigns the service requests to the plurality of servers using a second routing distribution algorithm;
wherein the routing and rerouting are performed by a border element in a voice over internet protocol system, and
wherein the first routing distribution algorithm is based on a round robin service order, and the second routing distribution algorithm is a modified version of the round robin service order of the first routing distribution algorithm that includes the designated server that has failed in a fixed order that does not vary, but varies the order of routing the service requests for all of the plurality of servers, except for the order of routing for the designated server that has failed, in a round robin service order.

8. The network communication node described in claim 7,
wherein a same percentage of service requests, of a total number of service requests routed to the plurality of servers, are assigned to the designated server that has failed after determining that the designated server has failed as before determining that the designated server has failed.

9. A non-transitory computer-readable storage medium encoded with a computer program that, when executed, controls the routing of service requests to a plurality of servers over a communication network, comprising:
routing the service requests to the plurality of servers using a first routing distribution algorithm;
waiting a first period of time for a designated server of the plurality of servers to respond to a service request assigned to the designated server;
transmitting the service request to the designated server a second time when the designated service does not respond to the service request within the first period of time;
waiting a second period to time for the designated server to respond to the service request assigned to the designated server, the second period of time being longer than the first period of time;
determining that the designated server has failed when the designated server does not respond to the service request within the second period of time;
rerouting the service request assigned to the designated server that has failed to a different server of the plurality of servers;
routing the service requests to the plurality of servers using a second routing distribution algorithm,
wherein the routing and rerouting are performed by a border element in a voice over internet protocol system, and
wherein the first routing distribution algorithm is based on a round robin service order, and the second routing distribution algorithm is a modified version of the round robin service order of the first routing distribution algorithm that includes the designated server that has failed in a fixed order that does not vary, but varies the order of routing the service requests for all of the plurality of servers, except for the order of routing for the designated server that has failed, in a round robin service order.

* * * * *